Sept. 6, 1927.
H. R. HUGHES
ROTARY DRILLING TOOL
Filed June 8, 1920
1,641,273
2 Sheets-Sheet 1
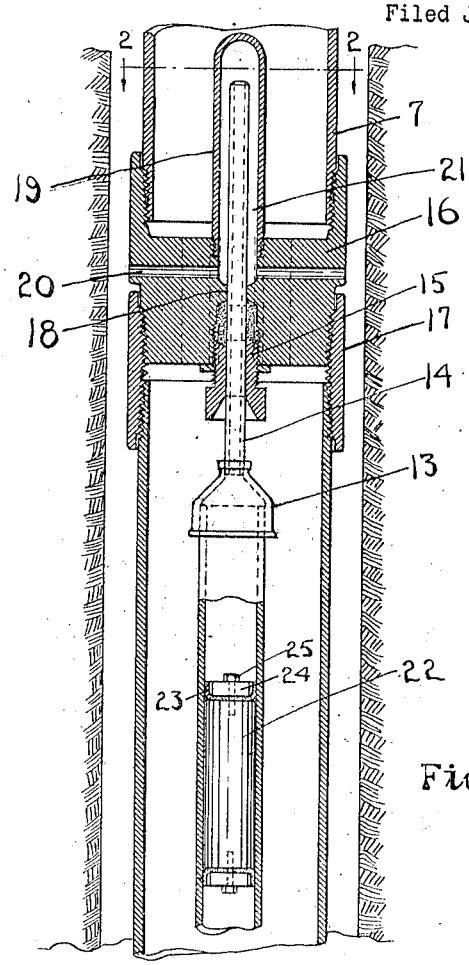
Fig.1
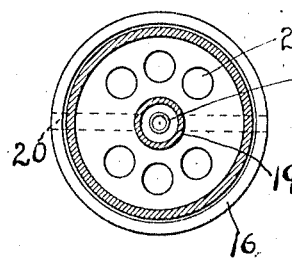
Fig. 2.
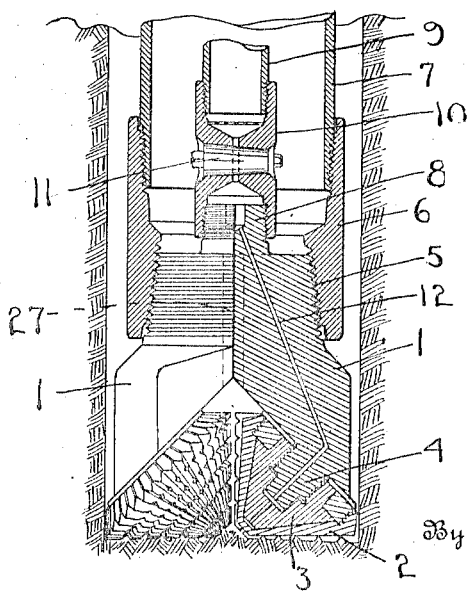
HOWARD R. HUGHES, Inventor
By Jesse R. Stone
Attorney Sept. 6, 1927.                H. R. HUGHES                1,641,273
                        ROTARY DRILLING TOOL
                         Filed June 8, 1920            2 Sheets-Sheet 2
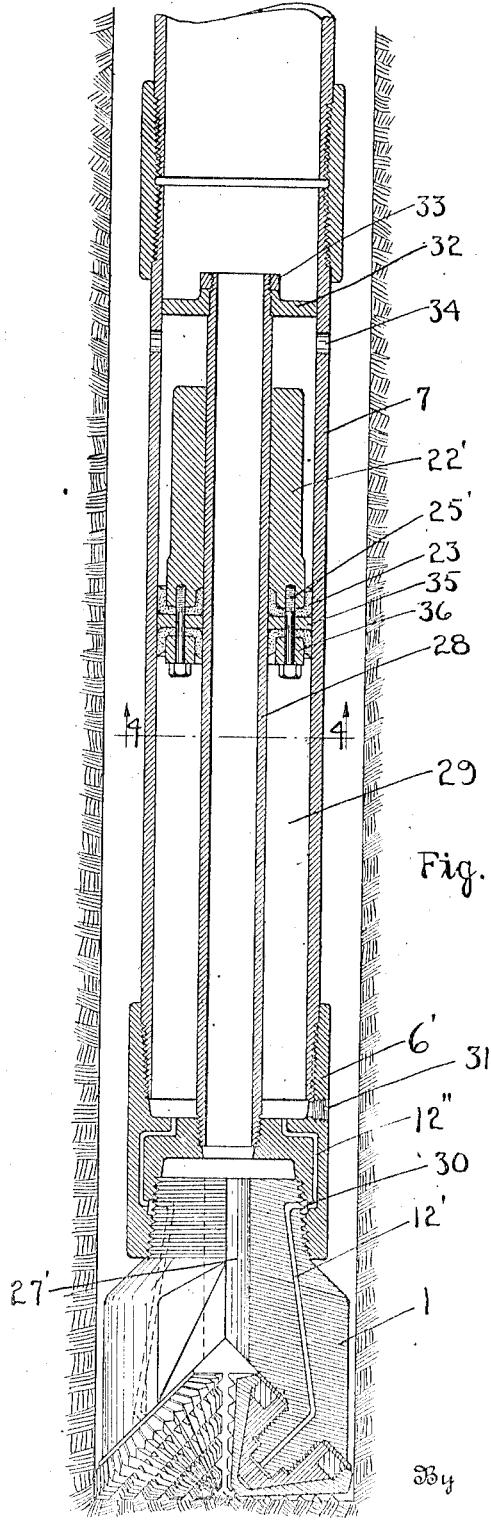
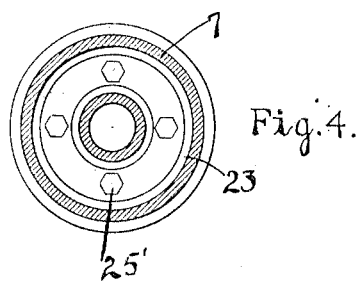
HOWARD R. HUGHES, Inventor
By Jesse R. Stone
Attorney Patented Sept. 6, 1927.

1,641,273

UNITED STATES PATENT OFFICE.

HOWARD R. HUGHES, OF HOUSTON, TEXAS; R. C. KULDELL ADMINISTRATOR OF SAID HOWARD R. HUGHES, DECEASED.

ROTARY DRILLING TOOL.

Application filed June 8, 1920. Serial No. 387,299.

My invention relates to an improvement in rotary boring tools for use in drilling in earth, rock or other formation for oil, water, sulfur and the like. It has especial application to lubricator attachments for supplying lubricant to the bearings of rotary cutters used on such tools.

In the lubricator attachments now used commonly in supplying lubricant to the bearings of cutters on rotary earth boring drills, the lubricant is stored in a central tube attached to the head of the bit and the pressure exerted upon a plunger resting upon the top of the lubricant in said tool, by the flushing water or mud pumped down through the drill stem, forces the lubricant down to the bearings against the back pressure exerted by the static head of water or mud in the hole. The pump pressure is often so great that mud and sand are forced past the plunger resting upon the oil and find a passage with the lubricant to the bearings of the cutters. My lubricator is intended to prevent excessive pressure of the flushing fluid upon the plunger and thus avoid the entrance of earth and sand with the lubricant to the bearings.

An object of my invention is to provide a lubricator attachment wherein the pressure upon the lubricant may be limited to a predetermined amount irrespective of the pump pressure or of the character of the flushing fluid—whether mud or water—and wherein the lubricant will be fed to the bearings under constant pressure at all times.

Another object is to provide a means of feeding the lubricant to the bearings by equalizing the pressure of a flushing fluid and by the pressure of a weight or spring exerted upon a plunger resting upon the lubricant. Further objects and advantages will more clearly appear in the specification which follows.

Referring to the drawing forming a part of this specification and wherein like numerals of reference are applied to like parts throughout the several views, Fig. 1 is a central longitudinal section through a drilling device showing the application of one form of my improved lubricator attachment; Fig. 2 is a transverse section on the line 2—2 of Fig. 1; Fig. 3 is a section similar to that shown in Fig. 1 illustrating another embodiment of my invention, and Fig. 4 is a transverse section on the line 4—4 of Fig. 3.

In the embodiment disclosed in Figs. 1 and 2, I have illustrated an improvement upon the form of lubricator disclosed in my previous Patent No. 930,759, granted August 10, 1909. This attachment is shown as applied to a drill bit comprising a head split longitudinally into two parts 1, 1, having mounted on the forward end thereof two conical-shaped rotatable cutters 2, said cutters being adapted to rotate on bearing members 3 threaded upon a pin 4 integral with the head. The upper ends of the two halves of the head are threaded at 5 for attachment to the drill collar 6, connecting the same to the drill stem 7. A central nipple 8 upon the head furnishes an attachment for the lubricant container 9 which is coupled to said nipple by means of a coupling member 10, having a valve 11 adapted to close the passage therethrough. Ducts 12 in the head connect the upper end of the said threaded nipple 8 to the bearings of the cutters 2.

The lubricant container 9 comprises a tubular length of pipe projecting upwardly within the drill stem and attached at its upper end to a swedged reducing coupling 13, connecting the same with a smaller tube 14 which projects upwardly through a stuffing box 15 within the coupling member 16. This coupling member is secured to the length of drill stem 7 by means of an ordinary collar 17. The upper end of the said coupling 16 is threaded interiorly for attachment to a continuation of the drill stem 7. This coupling member comprises a solid casting having a central passage 18 therethrough to rotatably receive the tube 14 of the lubricator, said tube projecting upwardly through said coupling and terminating within an elongated cap 19, closed at its upper end and threaded within the upper face of the coupling member 16. Laterally branching channels or passageways 20, extending radially from the central passage 18 within the coupling member, serve to allow an entrance for fluid from without the drill stem to the chamber 21 within the cap 19.

Within the lubricant container 9 is a piston or plunger 22. This plunger comprises a central cylindrical member of heavy material constituting a weight adapted to rest upon the lubricant. At each end of this central member is a cup of leather or other compressible material 23 secured to the central member by means of a washer 24 held in position by means of a set screw 25.

A plurality of passages 26 are provided longitudinally of the coupling member 16 to allow a passage downwardly through the said coupling member of the flushing fluid which is pumped through the drill stem to the bit from the surface of the ground. This flushing fluid finds a passage through the head of the bit by means of a central channel 27 so as to discharge the same upon the cutters and wash them free of material and to carry away the cuttings in suspension upwardly outside of the drill stem to the surface of the ground. The pressure within the drill stem, due to the force of the pumps, is greater than that outside the drill stem, this difference of pressure being due to the backing up of the flushing fluid as it is forced through the constricted channels 27 in the head of the bit.

When the pressure of the flushing fluid is exerted directly upon the plunger 22, resting upon the lubricant, the excess of pressure within the drill stem over the static head of water standing outside of the drill stem within the hole is so great as to sometimes force the flushing fluid past the plunger into the lubricant and thus allow the passage of grit and sand within the fluid to the bearings. It is obvious that this pressure, acting upon the plunger, will be great enough to force the lubricant downward against the back pressure of the static head without the bit so that lubricant will find a steady flow to the bearings during the operation of the bit. While the bit is not in operation, however, and the lubricant container is filled with lubricant it is desirable to close off the passage from the lubricator to the bit. This may be done by means of a valve 11. When the bit is inserted within the hole for operation, however, the valve 11 is opened, allowing the passage of lubricant to the bearings.

In the present construction I have so arranged the passage of flushing fluid to the plunger resting upon the surface of the lubricant that the pressure exerted upon the plunger at the upper end and the backward pressure, due to the static head of water within the hole, acting against the lubricant through the bearings will be approximately equal. This is done by allowing the entrance of the flushing water through the passage 20 into the chamber 21, and from thence through the tube 14 to the upper end of the lubricant chamber against the plunger 22. The direct pressure of the pumps is, therefore, not exerted upon the lubricant plunger 22, but the pressure upon the lubricant is equalized by allowing the static head without the drill stem to exert pressure at both ends of the lubricating system. It is obvious that in this situation no force tending to feed the lubricant to the bearings will exist. It is necessary, therefore, to provide a weight or its equivalent which will exert upon the plunger 22 sufficient pressure to force the lubricant downwardly. It is obvious that the resulting force upon the lubricant tending to feed it downwardly in the embodiment shown in the drawing will be simply the weight of the plunger itself and this weight is so regulated as to obtain the proper feed of the lubricant to the bearings.

In assembling this construction the lubricant container 9, having thereon the upwardly extending tube 14, is connected to the upper end of the bit, the lower length of drill stem 7 is then connected by means of the collar 6 to the bit. The coupling member 16, having the stuffing box 15 therein, is then forced downwardly over the tube 14 and connected to the drill stem, as shown in the drawing. The stuffing box will prevent the passage of fluid past the coupling but will allow the rotation of said coupling in order to screw the same into the collar connecting it to the drill stem 7.

In Figs. 3 and 4 I have illustrated another embodiment of my invention. This drill bit is practically identical with that shown in the one previously described, the oil ducts 12' being connected to the lubricator in a slightly different manner so as to accommodate the different form of the lubricator. In this embodiment the container for the lubricant is arranged outside of a central tubular member 28 which serves as a passage through the lower part of the drill stem to the bit for the flushing fluid.

The lubricant is contained, in this embodiment, in the annular chamber 29 between the water tube 28 and the drill stem 7 outside thereof. The drill stem is connected to the bit by means of a special drill collar 6', said collar having a branching duct 12'' which conducts the lubricant into an annular channel 30 midway of the shank of the bit, said channel connecting with the downwardly inclined ducts 12' leading to the bearings of the cutters. A threaded plug 31 is provided in said drill collar to allow a drainage of lubricant from the chamber 29 when desired.

The water tube 28 is threaded centrally within the drill collar 6' and serves to allow a passage of water through a central passageway 27' in the head of the bit to the cutters. At the upper end of the tube 28 I have provided for a closure for the space between the water tube and the drill stem by means of an annular disc fitting about the water tube and held in place thereon by means of a nut 33 threaded upon the upper end of said tube. At the upper end of the chamber 29 provided by this construction, I provide a plurality of openings 34 in the drill stem to allow a passage of the flushing fluid from without the drill stem to the oil chamber 29. The piston in this lubricator comprises an annular body member 22' having at the lower end thereof a packing member comprising two adjacent cups 23 of compressible material separated by a washer 35 and secured in place by an annular washer 36 attached by means of set screws 25' to the member 22'.

The operation of this lubricator attachment is practically identical with that disclosed in the first modification. In other words, the plunger rests upon the lubricant and the pressure of the static head of the flushing fluid within the hole is exerted through the openings 34 on the upper face of the plunger. A backward pressure, due to the static head of fluid, is exerted through the bearings and the ducts 12' to the lower end of the lubricant chamber, thus practically equalizing the pressure upon the lubricant, due to the flushing fluid. The resulting downward pressure upon the lubricant tending to force it to the bearings is due to the weight of the plunger 22' which is so regulated as to exert the pressure desired.

The advantages of this construction will now be apparent. The excessive pressure upon the plunger, due to the flushing fluid which ordinarily tends to force the mud and sand past the plunger into the lubricant, will be practically overcome, the pressure being equal in opposite directions. The weight of the plunger resting upon the lubricant will be sufficient to overcome the equalized pressure on the lubricant and will feed it with the desired effect to the bearings. While I have shown and described a piston actuated by a weight, I do not wish it understood that I may not employ other mechanical equivalent means in place of the weight without departing from the spirit of my invention and I do not wish to be limited to the exact construction shown further than is in accord with the appended claims.

Having thus described my invention, the advantages of which are now clearly apparent, what I claim as new and desire to protect by Letters Patent is:

1. In a rotary boring drill, a drill stem, a drill bit having rotary cutters attached thereto, a lubricant chamber on said bit within said drill stem, said drill stem providing a passage adjacent said lubricant chamber to said bit for flushing fluid, an inlet from without said drill stem to said chamber, a plunger below said inlet and means connected with said plunger to force said plunger downwardly upon said lubricant and force said lubricant through channels in said bit to said cutters for the purpose specified.

2. In a rotary boring drill, the combination of a drill head having rotary cutters thereon, with a lubricator attachment comprising a drill stem secured to said head, a central tube forming a water passage therethrough, an annular piston surrounding said tube and closing the upper end of the chamber between said tube and drill stem, said drill stem being perforated above said piston, separate means to depress said piston with uniform pressure, and ducts in said head between said chamber and the bearings of said cutters.

3. In a rotary boring drill, a drill head having rotary cutters thereon, a lubricator attachment comprising a drill stem, a tube forming a water passage therethrough, an annular piston surrounding said passage, a water passage from without said drill above said piston and separate means associated with said piston to exert an approximately uniform pressure on said piston, said heads having ducts connecting said lubricator and the bearings of said cutters.

In testimony whereof, I hereunto affix my signature, this the 5th day of June, A. D. 1920.

HOWARD R. HUGHES.